(12) United States Patent
Chen

(10) Patent No.: US 7,437,674 B2
(45) Date of Patent: Oct. 14, 2008

(54) VIDEO PROCESSING METHODS

(75) Inventor: Yi-Kai Chen, Tainan (TW)

(73) Assignee: Corel TW Corp., Taipei (TW)

( * ) Notice: Subject to any disclaimer, the term of this patent is extended or adjusted under 35 U.S.C. 154(b) by 596 days.

(21) Appl. No.: 10/973,393

(22) Filed: Oct. 27, 2004

(65) Prior Publication Data

US 2005/0235211 A1 Oct. 20, 2005

(30) Foreign Application Priority Data

Mar. 31, 2004 (JP) ............................. 2004-104583

(51) Int. Cl.
*G06F 3/00* (2006.01)
(52) U.S. Cl. ........................................ 715/723; 715/530
(58) Field of Classification Search ................ 345/112, 345/723; 386/52
See application file for complete search history.

(56) References Cited

U.S. PATENT DOCUMENTS

| 5,202,961 | A | * | 4/1993 | Mills et al. ................... 715/720 |
| 5,440,348 | A | * | 8/1995 | Peters et al. ................ 348/593 |
| 5,485,611 | A | * | 1/1996 | Astle ............................. 707/1 |
| 5,521,841 | A | * | 5/1996 | Arman et al. ................ 715/723 |
| 5,732,184 | A | * | 3/1998 | Chao et al. .................... 386/55 |
| 5,760,767 | A | * | 6/1998 | Shore et al. .................. 715/723 |
| 5,956,453 | A | * | 9/1999 | Yaegashi et al. ............. 386/52 |
| 6,026,389 | A | * | 2/2000 | Nakajima et al. ............. 707/1 |
| 6,222,532 | B1 | * | 4/2001 | Ceccarelli ................... 715/723 |
| 6,567,550 | B2 | * | 5/2003 | Miyatake et al. ............ 382/190 |
| 6,587,123 | B2 | * | 7/2003 | Ando et al. ................. 715/723 |
| 6,670,966 | B1 | * | 12/2003 | Kusanagi ..................... 715/723 |
| 6,744,968 | B1 | * | 6/2004 | Imai et al. ..................... 386/52 |
| 7,073,127 | B2 | * | 7/2006 | Zhao et al. .................. 715/719 |
| 7,152,209 | B2 | * | 12/2006 | Jojic et al. .................. 715/720 |

(Continued)

FOREIGN PATENT DOCUMENTS

JP 2004-072727 A 3/2004

(Continued)

OTHER PUBLICATIONS

Media Studio Pro 6.0, CNET editors' review, Apr. 30, 2001, published http://reviews.cnet.com/video-editors/mediastudio-pro-6-0.*

*Primary Examiner*—Rachna Singh
*Assistant Examiner*—Gregory A DiStefano
(74) *Attorney, Agent, or Firm*—Birch, Stewart, Kolasch & Birch, LLP

(57) ABSTRACT

A video processing method. A display region is provided according to a timeline, comprising at least one first sub-region with higher time resolution and one second sub-region with lower time resolution. A time scale value of the first sub-region is smaller than that of the second sub-region, and the first and second sub-regions have low-speed and medium-speed controls for scrolling forward and backward respectively. When a desired frame is located in the first sub-region, the low-speed or medium-speed control is scrolled to forward or backward on the timeline according to an operating command to locate the desired frame. When the desired frame is located in the second sub-region, the low-speed or medium-speed control is scrolled to forward or backward on the timeline according to an operating command to move the desired frame to the first sub-region.

16 Claims, 4 Drawing Sheets

U.S. PATENT DOCUMENTS

| | | | |
|---|---|---|---|
| 7,242,809 B2 * | 7/2007 | Hunter et al. | 382/224 |
| 2001/0036356 A1 * | 11/2001 | Weaver et al. | 386/52 |
| 2002/0133486 A1 * | 9/2002 | Yanagihara et al. | 707/3 |
| 2002/0154139 A1 * | 10/2002 | Hinson | 345/619 |
| 2002/0167540 A1 * | 11/2002 | Dobbelaar | 345/716 |
| 2003/0093801 A1 * | 5/2003 | Lin et al. | 725/90 |
| 2003/0097640 A1 * | 5/2003 | Abrams et al. | 715/530 |
| 2005/0216840 A1 * | 9/2005 | Salvucci | 715/723 |
| 2005/0235198 A1 * | 10/2005 | Howard et al. | 715/500.1 |

FOREIGN PATENT DOCUMENTS

| | | |
|---|---|---|
| WO | WO 2007102862 A1 * | 9/2007 |

* cited by examiner

VIDEO PROCESSING METHODS

This Non-provisional application claims priority under 35 U.S.C. § 119(a) on Patent Application No(s). 2004-104583 filed in Japan on Mar. 31, 2004, the entire contents of which are hereby incorporated by reference.

BACKGROUND OF THE INVENTION

The invention relates data processing methods, and in particular to video processing methods.

In some conventional video editing software applications, a slider is dragged along a timeline to move a desired frame to a display region for video processing using editing tools. Time scale values applied in current video editing tools are fixed, such that when the slider moves on the timeline, it travels one unit per movement with shifting a predetermined number of frames. Thus, a desired frame can be located by repeatedly changing the time scale value.

A film, for example, shot at a rate of thirty frames per second with duration of one hour, comprises 108000 frames. As shown in FIG. 1, suppose a default time scale value is one second, indicating that a slider (the arrow shown in FIG. 1A) moves on a timeline, travels one unit per movement with shifting 30 frames. When a frame requires editing, it is difficult to accurately locate the frame using the default time scale value. Thus, the time scale value is set to $\frac{1}{30}$ seconds, indicating that when the slider moves on the timeline, it travels one unit per movement with shifting one frame, as shown in FIG. 1B.

Additionally, the slider is located at the 3001st frame on the timeline, as shown in FIG. 1A, and locating the 15000th frame using the time scale value ($\frac{1}{30}$ seconds or one second) can be time-consuming. Accordingly, the time scale value can be set as 10 seconds, indicating that when the slider moves on the timeline, it travels one unit per movement with shifting three hundred frames, as shown in FIG. 1C.

As summarized above, conventional video editing methods force a user to repeatedly change the time scale, thus consuming excessive time when searching for a desired frame. Thus, an improved video editing method is desirable.

SUMMARY

Accordingly, a video editing interface is provided. Some embodiments of the region comprise at least one first sub-region and two second sub-regions provided according to a timeline, in which the first sub-region is between the two second sub-regions. A time scale value of the first sub-region is smaller than that of each second sub-region. The first and each second sub-region have low-speed and medium-speed controls with corresponding locations to the timeline respectively for scrolling forward and backward.

When a desired frame is located in the first sub-region, the low-speed or medium-speed control is scrolled to forward or backward on the timeline according to an operating command to locate the desired frame. When a desired frame is located in one second sub-region, the low-speed or medium-speed control is scrolled to forward or backward on the timeline according to an operating command to move the desired frame from the second sub-region to the first sub-region.

In addition, the display region further comprises two third sub-regions, located respectively besides the two second sub-regions. A time scale value of each third sub-region is greater than that of the first sub-region or each second sub-region. Each third sub-region has a high-speed control with a corresponding location on the timeline for scrolling forward and backward. When a desired frame is located in one third sub-region, the medium-speed or high-speed control is scrolled to forward or backward on the timeline according to an operating command to move the desired frame from the third sub-region to the first or second sub-region.

Also disclosed is a video processing method. First, a display region comprising at least one first sub-region and one second sub-region adjacent to the first sub-region is provided according to a timeline. A time scale value of the first sub-region is smaller than that of the second sub-region. The first and second sub-regions have low-speed and medium-speed controls with corresponding locations on the timeline for scrolling forward and backward respectively.

A desired frame in the sub-region is searched for. When the desired frame is located in the first sub-region, the low-speed or medium-speed control is scrolled to forward or backward on the timeline according to an operating command to locate the desired frame. When the desired frame is located in the second sub-region, the low-speed or medium-speed control is scrolled to forward or backward on the timeline according to an operating command to move the desired frame to the first sub-region.

The display region further comprises a third sub-region adjacent to the first or second sub-region. A time scale value of the third sub-region is greater than that of the first or second sub-region, and the third sub-region has a high-speed control with a corresponding location on the timeline for scrolling forward and backward. When the desired frame is located in the third sub-region, the medium-speed or high-speed control is scrolled to forward or backward on the timeline according to an operating command to move the desired frame to the first or second sub-region.

A detailed description is given in the following embodiments with reference to the accompanying drawings.

DESCRIPTION OF THE DRAWINGS

The present invention can be more fully understood by reading the subsequent detailed description and examples with references made to the accompanying drawings, wherein.

DETAILED DESCRIPTION

Video processing methods and video editing interfaces thereof are provided.

Figure 1A:
FIG. 1A is a schematic diagram showing a predetermined number of video frames in accordance with a default time scale value corresponding to a timeline.
Figure 1B:
FIG. 1B is a schematic diagram showing a predetermined number of video frames in accordance with a smaller time scale value corresponding to the timeline than the default value.
Figure 1C:
FIG. 1C is a schematic diagram showing a predetermined number of video frames in accordance with a greater time scale value corresponding to a timeline than the default value.
Figure 2:
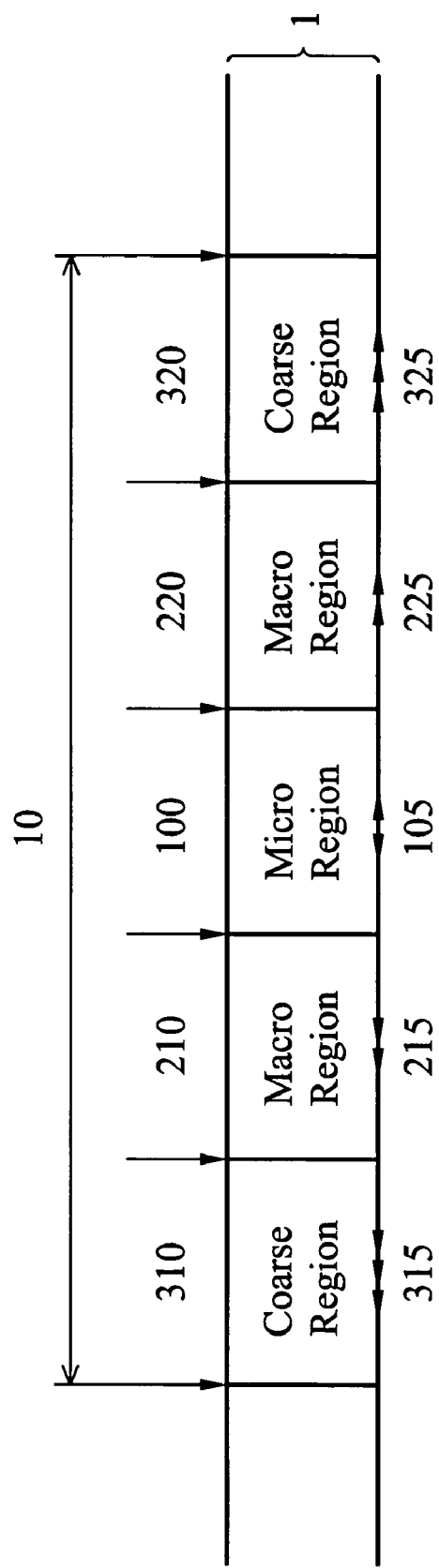
FIG. 2 is a schematic diagram showing an embodiment of a video editing interface.

As will be described in detail hereafter, some embodiments comprise at least a video editing interface as shown in FIG. 2.

Some embodiments comprise display region 10, comprising a micro region 100, macro regions 210 and 220, and coarse regions 310 and 320, according to a timeline 1. Micro region 100 has a low-speed control 105, macro regions 210 and 220 have medium-speed controls 215 and 225 respectively, and coarse regions 310 and 320 have high-speed controls 315 and 325 respectively. A time scale value of micro region 100 is less than time scale values of macro regions 210 and 220 respectively, and the time scale values of macro regions 210 and 220 are less than the time scale values of coarse regions 310 and 320 respectively.

Figure 3:
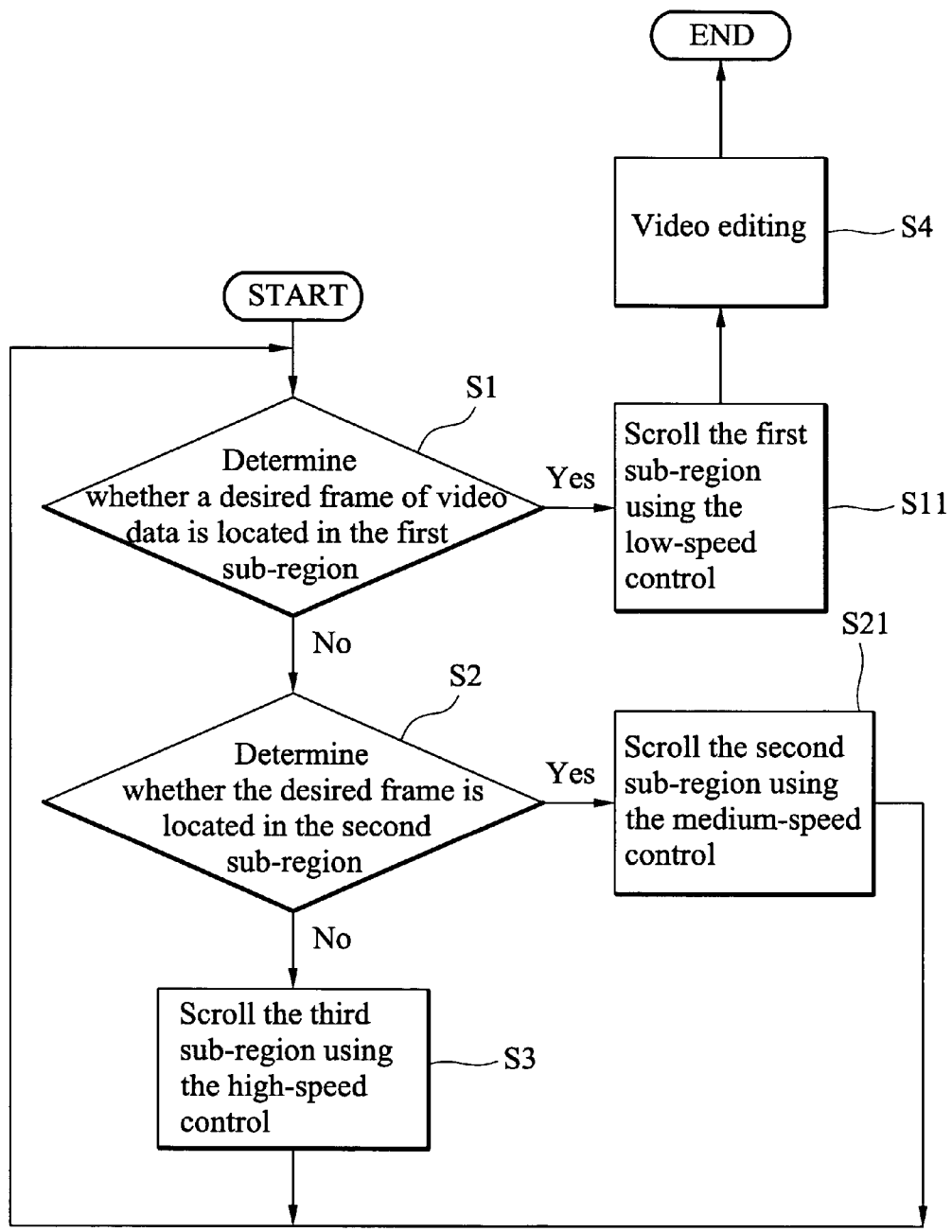
FIG. 3 is flowchart showing an embodiment of a video processing method.

FIG. 3 is flowchart showing an embodiment of a video processing method. A display region, as shown in FIG. 2, comprising a first sub-region, two second sub-regions, and two third sub-regions, is provided according to a timeline, in which the first sub-region is between the two second sub-regions, and the third sub-regions are located adjacent to the two second sub-regions.

It is determined whether a desired frame of video data is located in the first sub-region (step S1). If the desired frame is located in the first sub-region, video data included in the first sub-region is scrolled to forward or backward using a low-speed control on the timeline according to an operating command to locate the desired frame (step S11). Video editing is preformed when the desired frame is acquired (step S4).

Next, if the desired frame is not located in the first sub-region, it is determined whether the desired frame of the video data is located in the second sub-region (step S2). If the desired frame is located in the second sub-region, video data included in the second sub-region is scrolled to forward or backward using a medium-speed control on the timeline according to an operating command to move the desired frame from the second sub-region to the first sub-region (step S21). The process then proceeds to step S1.

When the desired frame is located in the third sub-region or is not located in any sub-region, video data included in the third sub-region is scrolled to forward or backward using a high-speed control on the timeline according to an operating command to move the desired frame from the third sub-region to the first or second sub-region (step S3). The process then processes to step S1.

Figure 4:
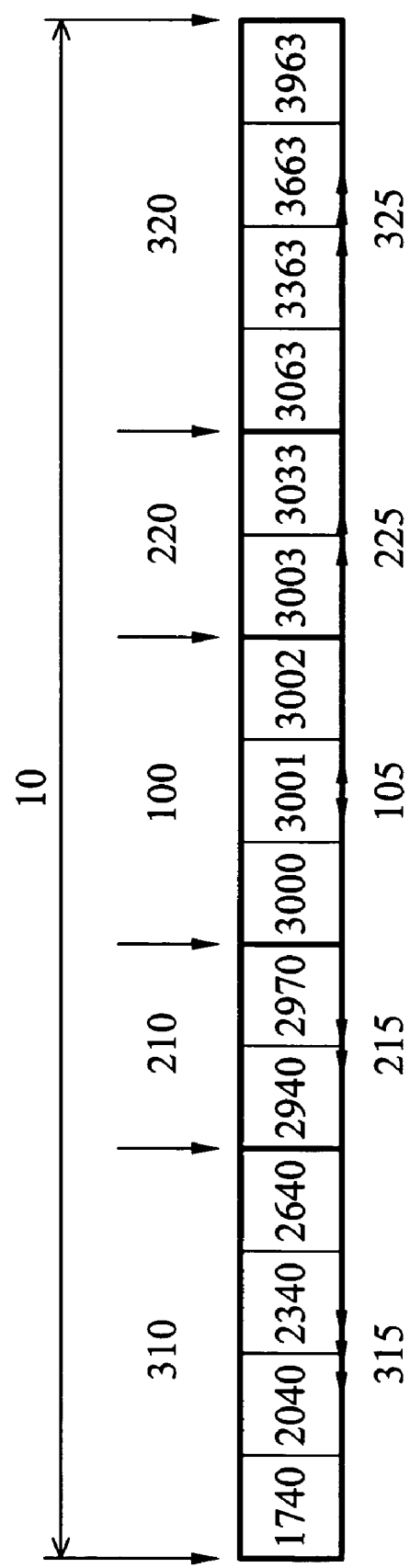
FIG. 4 is a schematic diagram showing an embodiment of a display region including a plurality of sub-regions corresponding to different time scale values.

FIG. 4 is a schematic diagram showing an embodiment of a display region including a plurality of sub-regions corresponding to different time scale values.

As described in FIG. 2, display region 10 comprises a micro region 100, macro regions 210 and 220, and coarse regions 310 and 320. If a time scale value of micro region 100 is 1/30 seconds, time scale values of macro regions 210 and 220 are 1 second respectively, and time scale values are 10 seconds respectively. In addition, if a video file is shot at a rate of thirty frames per second, and each video section of micro region 100 comprises one frame, each video section of macro regions 210 and 220 comprises thirty frames, and each video section of coarse regions 310 and 320 comprises three hundred frames.

When a desired frame is located in coarse region 310 or is not located within display region 10, display region 10 is moved at a rate of three hundred frames per second, leftward direction using high-speed control 315 of coarse region 310, shifting the desired frame to macro region 210 or micro region 100. When the desired frame is located in macro region 220, display region 10 is moved at a rate of thirty frames per second, rightward direction using medium-speed control 225 of macro region 310, shifting the desired frame to micro region 100. When the desired frame is located in micro region 100, display region 10 is moved at a rate of one frame per second, shifting the desired frame to the center of micro region 100 for video editing.

Video processing methods provide an improved timeline that unites different time scale settings for enabling rapid location on a desired frame. In addition, the described time scale values are not limited to the disclosed embodiments, and it is intended to cover various modifications and similar arrangements.

While embodiments of the invention have been described by way of example and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A video processing method, comprising the steps of:
providing a display region according to a timeline, wherein the display region comprises at least one first sub-region and one second sub-region adjacent to the first sub-region, wherein the first and second sub-regions are arranged along the timeline, a time scale value of the first sub-region is smaller than that of the second sub-region, and the first sub-region has a low-speed control and the second sub-region has a medium-speed controls with corresponding locations on the timeline for scrolling forward and backward respectively;
providing video data comprising a plurality of frames, wherein the respective frames are displayed in the first sub-region or the second sub-region along the timeline;
determining the location of a desired frame among the video data is in the first sub-region or the second sub-region;
when the desired frame is located in the first sub-region, scrolling the low-speed control forward or backward on the timeline according to an operating command to move the video data based on the time scale value of the first sub-region, thereby moving the desired frame to a specific position; and
when the desired frame is located in the second sub-region, scrolling the medium-speed control forward or backward on the timeline according to an operating command to move the video data based on the time scale value of the second sub-region, thereby moving the desired frame to enter the first sub-region,
wherein when the desired frame enters the first sub-region, the desired frame is moved by scrolling the low-speed control forward or backward based on the time scale value of the first sub-region.

2. The method as claimed in claim 1, wherein the display region further comprises a third sub-region, adjacent to the first or second sub-region.

3. The method as claimed in claim 2, wherein a time scale value of the third sub-region is greater than that of the first or second sub-regions, and the third sub-region has a high-speed control with a corresponding location on the timeline for scrolling forward and backward.

4. The method as claimed in claim 3, wherein when the desired frame is located in the third sub-region, the high-speed control is scrolled to forward or backward on the timeline according to an operating command to move the desired frame to the first or second sub-region.

5. A video editing system, tangibly embodied on a computer readable medium, for performing video editing, comprising:
a display region, comprising at least one first sub-region and two second sub-regions, wherein the first sub-region is between the two second sub-regions, and the first and second sub-regions are arranged along the timeline, a time scale value of the first sub-region is smaller than that of each second sub-region, and the first sub-region has a low-speed control and each of the second sub-regions has a medium-speed controls with corresponding locations on the timeline respectively for scrolling forward and backward, wherein, during video editing, a desired frame is moved by scrolling the medium-speed control forward or backward based on the time scale value of the second sub-region in the second sub-region, and when the desired frame enters the first sub-region, the desired frame is moved by scrolling the low-speed control forward or backward based on the time scale value of the first sub-region in the second sub-regions.

6. The system as claimed in claim 5, wherein when a desired frame is located in the first sub-region, the low-speed control is scrolled to forward or backward on the timeline according to an operating command to locate the desired frame.

7. The system as claimed in claim 5, wherein when a desired frame is located in one of the second sub-region, the medium-speed control is scrolled to forward or backward on the timeline according to an operating command to move the desired frame to the first sub-region.

8. The system as claimed in claim 5, wherein the display region further comprises two third sub-regions, located respectively adjacent to the two second sub-regions.

9. The system as claimed in claim 8, wherein a time scale value of each third sub-region is greater than that of the first sub-region or each second sub-region, and each third sub-region has a high-speed control with a corresponding location on the timeline for scrolling forward and backward.

10. The system as claimed in claim 9, wherein when a desired frame is located in one third sub-region, the high-speed control is scrolled to forward or backward on the timeline according to an operating command to move the desired frame to the first or one second sub-region.

11. A storage medium for storing a computer program providing a method for automatic booting a computer system, comprising using a computer to perform the steps of:

providing a display region according to a timeline, wherein the display region comprises at least one first sub-region and one second sub-region adjacent to the first sub-region, wherein the first and second sub-regions are arranged along the timeline, a time scale value of the first sub-region is smaller than that of the second sub-region, and the first sub-region has a low-speed control and second sub-region has a medium-speed controls with corresponding locations on the timeline for scrolling forward and backward respectively;

providing video data comprising a plurality of frames, wherein the respective frames are displayed in the first sub-region or the second sub-region along the timeline;

determining the location of a desired frame among the video data is in the first sub-region or the second sub-region;

when the desired frame is located in the first sub-region, scrolling the low-speed control forward or backward on the timeline according to an operating command to move the video data based on the time scale value of the first sub-region, thereby moving the desired frame to a specific position; and when the desired frame is located in the second sub-region, scrolling the medium-speed control forward or backward on the timeline according to an operating command to move the video data based on the time scale value of the second sub-region, thereby moving the desired frame to the first sub-region, wherein when the desired frame enters the first sub-region, the desired frame is moved by scrolling the low-speed control forward or backward based on the time scale value of the first sub-region.

12. The storage medium as claimed in claim 11, wherein the display region further comprises a third sub-region, adjacent to the first or second sub-region.

13. The storage medium as claimed in claim 12, wherein a time scale value of the third sub-region is greater than that of the first or second sub-region, and the third sub-region has a high-speed control with a corresponding location on the timeline for scrolling forward and backward.

14. The storage medium as claimed in claim 13, wherein when the desired frame is located in the third sub-region, the high-speed control is scrolled to forward or backward on the timeline according to an operating command to move the desired frame to the first or second sub-region.

15. A video processing method, scrolling video data on a timeline for locating a desired frame, comprising the steps of:

providing a display region according to the timeline, wherein the display region comprises at least one first sub-region and one second sub-region adjacent to the first sub-region, wherein the first and second sub-regions are arranged along the timeline, a first time scale value corresponding to the first sub-region is different from a second time scale value of the second sub-region, the first and second sub-regions have controllers corresponding to the first and second time scale values respectively;

providing video data comprising a plurality of frames, wherein the respective frames are displayed in the first sub-region or the second sub-region along the timeline, and scrolling the video data using the controllers on the timeline in accordance with the first and second time scale values respectively according to operating commands, wherein the video data is moved based on the first time scale value when the controller of the first sub-region is used, and the video data is moved based on the second time scale value when the video data is located in the second sub-region and the controller of the second sub-region is used.

16. A storage medium comprising a video editing program, which, when executed, causes a device to perform video editing, comprising:

generating a display region, comprising at least one first sub-region and two second sub-regions, regions, wherein the first sub-region is between the two second sub-regions, and the first and second sub-regions are arranged along the timeline, a time scale value of the first sub-region is smaller than that of each second sub-region, and the first sub-region has a low-speed control and each of the second sub-regions has a medium-speed control with corresponding locations on the timeline respectively for scrolling forward and backward, wherein a desired frame is moved by scrolling the medium-speed control forward or backward based on the time scale value of the second sub-region in the second sub-region, and when the desired frame enters the first sub-region, the desired frame is moved by scrolling the low-speed control forward or backward based on the time scale value of the first sub-region in the second sub-regions.

* * * * *